United States Patent [19]

Takehara et al.

[11] Patent Number: 4,930,559
[45] Date of Patent: Jun. 5, 1990

[54] PNEUMATIC TIRE

[75] Inventors: Kenji Takehara, Kobe; Yoshiyuki Takada, Shirakawa, both of Japan

[73] Assignee: Sumitomo Rubber Industries, Ltd., Hyogo, Japan

[21] Appl. No.: 213,304

[22] Filed: Jun. 29, 1988

[30] Foreign Application Priority Data

Jul. 1, 1987 [JP] Japan ................................ 62-166071
Jun. 7, 1988 [JP] Japan ................................ 63-140704

[51] Int. Cl.$^5$ ................................................ B60C 9/20
[52] U.S. Cl. ..................................... 152/531; 152/454; 152/536; 152/538
[58] Field of Search ............... 152/531, 538, 536, 535, 152/534, 209 A, 209 R, 454, 456, 532

[56] References Cited

U.S. PATENT DOCUMENTS

| | | | |
|---|---|---|---|
| 3,155,135 | 11/1964 | Klenk | 152/456 X |
| 3,842,884 | 10/1974 | Bertrand | 152/531 X |
| 4,258,775 | 3/1981 | Samoto | 152/531 |
| 4,282,918 | 8/1981 | Tomoda et al. | 152/454 X |
| 4,498,514 | 2/1985 | Maathius et al. | 152/531 X |

FOREIGN PATENT DOCUMENTS 58-61005 11/1983 Japan .
61-157401 7/1986 Japan ................................ 152/454

Primary Examiner—Raymond Hoch
Attorney, Agent, or Firm—Birch, Stewart, Kolasch & Birch

[57] ABSTRACT

A pneumatic tire comprising: a pair of bead cores; a carcass turned over at its both ends around the bead cores; a tread on the carcass; a belt comprising at least two plies of steel cords and dispsoed radially outside the carcass; a pair of inner bands disposed between the carcass and the belt and each having strectchable cords made of organic fibers, the inner band cords laid substantially parallel to the tire equator; and the axially outer edge of the inner bands and the edges of a widest ply of the belt being substantially trued up, whereby both steering stability and high speed durability are improved.

7 Claims, 4 Drawing Sheets

PNEUMATIC TIRE

The present invention relates to a pneumatic tire, which is improved in both steering stability and high speed durability, and also enhanced in the wear resistance by making uniform the ground contact pressure distribution.

As the expressway network is expanded and the traveling speed of automobiles, especially, passenger cars increases, radial tires having radially arranged carcass cords and a belt composed of steel cords disposed outside thereof are widely employed as the tires suited to high speed traveling. In such radial tires, however, lifting may occur at both ends of the belt to cause separation from the surrounding rubber due to centrifugal force by rotation of tires when traveling at high speed. Especially when a cut end ply is used for the belt, the rubber separation may be further promoted also due to defective adhesion with the rubber at its cut end.

In order to prevent separation from the rubber at the belt ply ends and improve the high speed durability, various tires have been proposed: for example, the tire having a band B made of organic fibers disposed on each end of the shoulder side of a belt A as shown in FIG. 4, the tire having two bands B as shown in FIG. 5, the tire having a band C to cover the entire belt A in addition to the band B as shown in FIG. 6, the tire having only the band C to cover the entire surface as shown in FIG. 7, and the tire having two bands C, C to cover the entire surface as shown in FIG. 8.

Concerning high speed durability, however, the tire having two bands B as shown in FIG. 5 is superior to the one having only one band B as shown in FIG. 4. Besides, as compared with the tire having one band C as shown in FIG. 7, the tire comprising the band B and the band C to cover the entire surface is found to be superior in high speed durability.

Nevertheless, as shown in FIG. 5, when two bands B are used, a difference in rigidity is likely to occur between the outer edges of the belt A, that is, the shoulder portions of the tire and the crown portion, and the ground contact pressure distribution on the tread surface tends to be uneven. As a result, the steering stability, especially the steering stability at high speed becomes insufficient, and the wear may become uneven. Incidentally, when two bands C, C are used to cover the entire surface of the belt A as shown in FIG. 8, if there is no difference in rigidity, the rigidity is lessened by the band C made of organic fibers instead of the belt A made of steel cords, and the stiffness of the tread surface is decreased, and the high speed steering stability itself may be lowered. A similar problem exists in FIG. 7.

Furthermore, the Japanese Laid-open Patent (KOKAI) No. 58-61005 proposes, as shown in FIG. 9, to dispose a band D between the carcass and the belt A, in addition to the band B to cover the radial outside of the belt A.

In this proposal, however, the upper and lower bands B, D are largely inclined reversely to each other with respect to the tire equator at an angle of 8 to 15 degrees, and such largely inclined bands B, D tend to be excessively low in the stiffness in the tire equatorial direction, and an effective function may not be obtained as a band.

An object of the present invention is therefore, to provide a pneumatic tire which is improved in high speed durability while maintaining the high speed steering stability and effectively prevent the separation of the belt end portions from rubber by disposing an inner band with band cords substantially parallel to the tire equator between the belt and the carcass.

On the other hand, as the characteristics of tires, reduction of uneven wear and improvement of wear resistance are required aside form the steering stability and high speed durability stated above, and accordingly it is desired to keep uniform the ground contact pressure distribution on the tread surface.

By disposing a band in the shoulder portion as mentioned above, however, the rigidity in this portion is increased, and the bulge-out amount becomes relatively small when compared with the crown portion at the time of tire inflation. As a result, the ground contact pressure in the crown portion where the bulge-out amount is relatively large, becomes excessively large, which tends to cause an uneven ground contact pressure distribution.

Therefore, another object of the present invention is to provide a pneumatic tire in which the distribution of the ground contact pressure is uniform in the ground contact surface and the wear resistance is enhanced by basically maintaining the ratio of the radii of curvature in the crown portion and shoulder portions on the tread surface, at 5% pressure, within a specified range.

According to one aspect of the present invention, the pneumatic tire comprises: a pair of bead cores; a carcass turned over at its both ends around the bead cores to be secured; a tread disposed on the carcass; a belt comprising at least two plies of steel cords and disposed radially outside the carcass; a pair of inner bands disposed between the carcass and the belt and each having stretchable cords made of organic fibers, the inner band cords laid substantially parallel to the tire equator; and the axially outer edge of the inner bands and the edges of a widest ply of the belt being substantially trued up.

Therefore, the rigidity in the shoulder portions is increased by the inner band having stretchable band cords arranged nearly parallel to the tire equator, which contributes to enhancement of steering stability of tires. By disposing such inner band radially inside the belt, the stress concentration at the belt end parts caused by turning of tires may be alleviated, so that separation from the rubber at the end parts may be prevented. Besides, since the outer edge of the inner bands nearly coincides with the edge of the belt, the stress concentration at the edge may be lessened, and separation may be prevented, which will enhance the high speed durability of tires.

An embodiment of the present invention will now be described in detail with reference to the drawings, in which.

Figure 1:
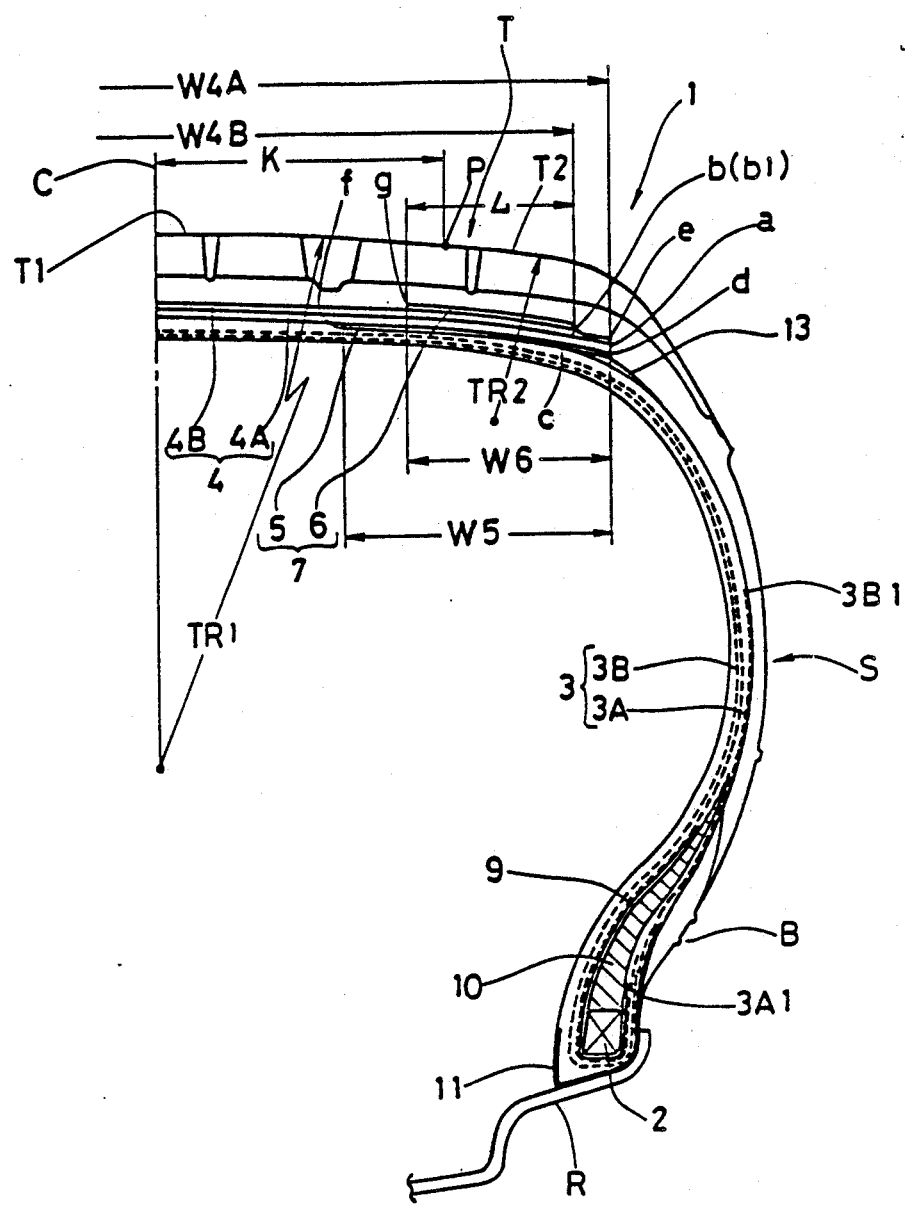
FIG. 1 is a sectional view showing an embodiment of the present invention.

In FIG. 1, a pneumatic tire 1 has a tread T, a pair of beads B, and a pair of sidewalls S therebetween, and also comprises a carcass 3 which is turned over from the inside to the outside of the tire around a bead core 2 of the bead B where it is secured. A belt 4 is disposed radially outside the carcass 3, and further the tire is provided with band 7 which comprises, in this embodiment, an inner band 5 disposed between the carcass 3 and the belt 4, and an outer band disposed radially outside the belt 4.

Each bead is provided with a bead apex 10 made of a rubber material which is tapered radially outward from the bead core 2 in order to improve the transverse rigidity. Also each bead is provided with a chafer 11 for preventing chafe by the rim.

The carcass 3 is composed of an inner ply 3A which surrounds the bead core 2 by way of a reinforcing layer 9, and an outer ply 3B disposed along the outer side of the inner ply 3A. The turn-over end 3A1 of the inner ply 3A is interrupted above the bead core 2, while the turn-over end 3B1 of the outer ply 3B is interrupted near the position of the maximum width of the tire. Incidentally, the reinforcing layer 9 not only prevents abrasion of the bead core 2 and the inner ply 3A, moved by deformation by ground contact of the tires, but also enhances the rigidity of the bead.

Meanwhile, the carcass 3 has a radial structure in which the carcass cords are arranged at 60 to 90 degrees with respect to the tire equator C, and as the carcass cords, organic fiber cords of nylon, rayon, polyester and others may be used aside from steel cords.

The above-mentioned belt 4 is, in this embodiment, composed of inner and outer belt plies 4A, 4B, and the width W4A of the inner belt ply 4A at the carcass 3 side is set about 1.01 to 1.20 broader than the width W4B of the outer belt ply 4B, thereby preventing a concentration of difference in rigidity against the surrounding rubber which is caused by matching the axial outer edges (a, b) of the belt plies 4A, 4B. In this embodiment, the overlapping region of the belt plies 4A, 4B is formed in the crown portion from the above-mentioned edge (b), and this edge (b) becomes the starting point b1 of the shoulder side of the overlapped region.

The cords of the belt plies 4A, 4B are steel cords, and the steel cords are arranged to incline about 10 to 30 degrees to the tire equator and are opposite to each other by the inner and outer belt plies 4A, 4B, so that the uniformity of the tire is enhanced.

Incidentally, the outer belt ply 4B may be designed broader than the inner belt ply 4A.

Furthermore, the inner belt ply 4A contacts with the carcass 3 between the points (c) in the widthwise direction of the tire, and is spaced from the carcass 3 outside of the point c. At this spacing part there is a breaker cushion 13 made of a triangular soft rubber which is located at the end of the belt 4 and is extended to the shoulder side along the carcass 3 from the spacing part.

The above-mentioned inner band 5 is disposed, with the axially outer edge (d) thereof nearly matched with the edge (a) of the belt ply having the maximum width, or the inner belt ply 4A in this embodiment. In this case, "nearly matched" means that the outer edge (d) of the inner band 5 correctly coincides with the edge (a) of the belt ply 4A without being located axially inward thereof, or it is projected outward in a range not exceeding 8 mm, or preferably 5 mm, from the edge (a). Yet, the inner band 5 contacts with the radial inside of the inner belt ply 4A, and the end part of the inner band is held between the belt ply 4A and the breaker cushion 13.

The width W5 of the inner band 5 is set in a range of 15 to 40% of the maximum width W4 of the belt 4, that is, the width W4A of the inner belt ply 4A in this embodiment.

The above-mentioned outer band 6, on the other hand, has its outer edge (e) in the widthwise direction of the tire nearly matched with the outer edge (d) of the inner band 5, and this outer band 6 covers the outer end part of the outer belt ply 4B, and its width W6 is set within a range of 15 to 40% of the width W4A of the belt ply 4A, and equal to or smaller than the width W5 of the inner band 5.

The inner band 5 and outer band 6 are both made of cords of organic fibers, and the materials of such organic fibers are nylon, polyester, rayon and other relatively stretchable fibers. Therefore, the cords are expanded or contracted by following up the expansion or contraction of the belt 4 when the tire is deformed, so that separation from the belt 4 may be prevented.

The band cords are arranged so as to be substantially parallel to the tire equator C individually, that is, in a range of 0 to 4 degrees, or preferably 0 to 2 degrees, with respect to the tire equator C.

Figure 2:
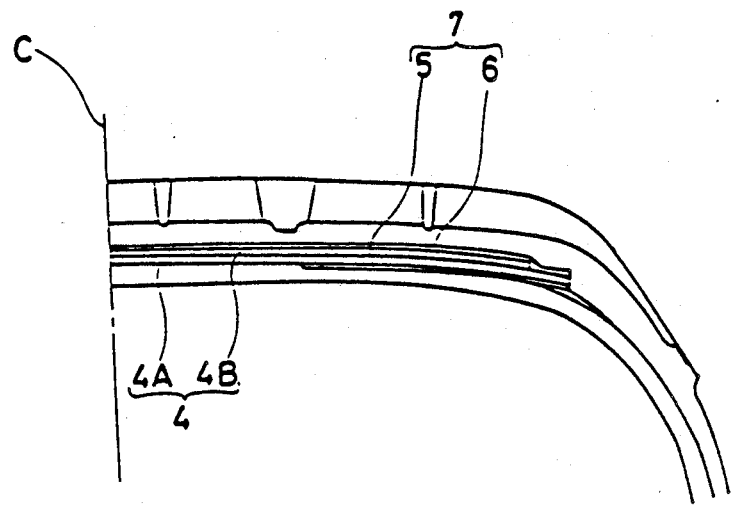
FIGS. 2 and 3 are sectional views each showing another embodiment.
Figure 3:
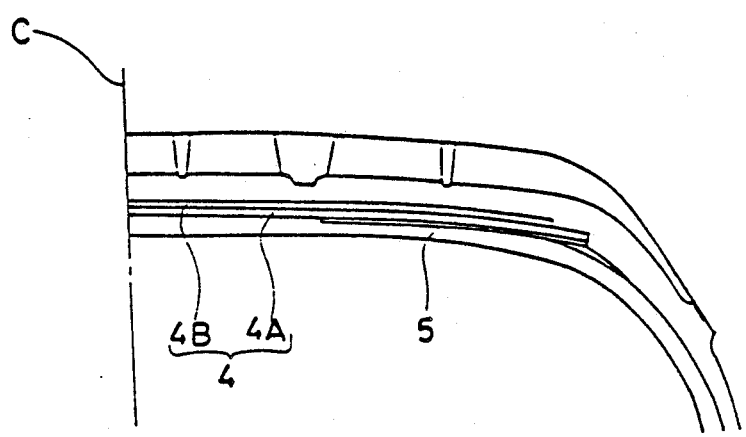

Meanwhile, as shown in FIG. 2, the outer band 6 may be also formed in such a manner as to cover the entire region of the belt, or the outer band 6 may be omitted as shown in FIG. 3.

Thus, anyway, the pneumatic tire 1 has the inner band 5, which is inclined at a small angle to the tire equator C and is made of stretchable band cords of organic fibers, disposed between the carcass 3 and the belt 4.

Therefore, the tension acting on the carcass 3 may be smoothly transmitted to the belt 4 through the inner band 5, and the rigidity at the shoulder portion is increased by the increased tension in the belt 4, thereby contributing to enhancement of the steering stability of the tires.

Furthermore, by disposing such inner band 5 at the radial inside of the belt 4, stress concentration at the end part of the belt 4 due to turning of the tires may be alleviated, and separation from the rubber at the end part may be prevented.

Besides, since the outer edge (d) of the inner band 5 nearly coincides with the outer edge (a) of the inner belt ply 4A, the stress concentration at the outer edge (d) is reduced, and separation is prevented, so that high speed durability of tire may be enhanced.

Still more, by placing the end part of the inner band 5 somewhere between the belt 4 and the breaker cushion 13, the buffer effect by the inner band 5 may be enhanced further by coordinating with the breaker cushion 13, so that the preventive effect of separation may be further increased.

Figure 5:
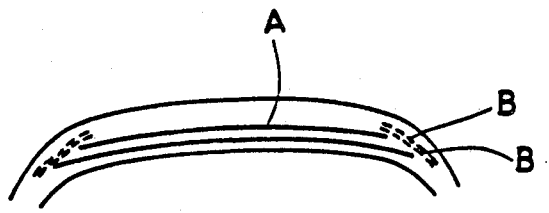
Figure 6:
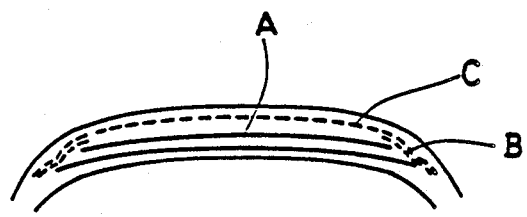
Figure 7:
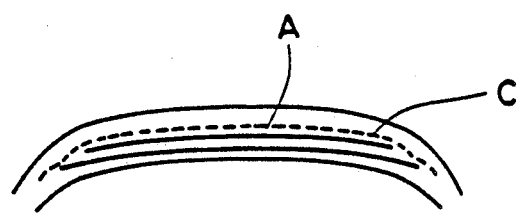

Furthermore, as shown in FIG. 1, the outer band 6 to cover the end of the belt 4 decreases, together with the inner band 5, the difference in rigidity between the end part and crown side part of the belt 4 when using plural bands B as shown in FIG. 5, and contributes to making uniform the distribution of the ground contact pressure, thereby enhancing the steering stability at high speed and making the wear even.

Figure 8:
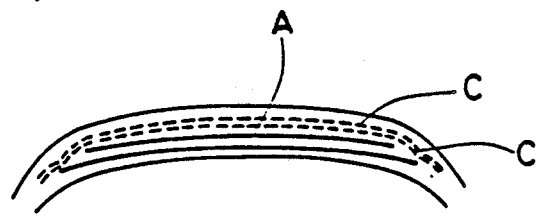
Figure 9:
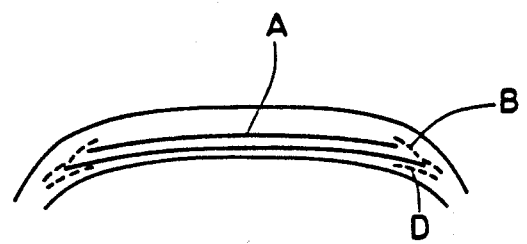

Moreover, as shown in FIG. 2, when the outer band 6 covers the entire width of the belt 4, separation from the rubber at the end part of the belt 4 may be prevented by coordinating with the inner band 5, and different from the case of disposing two bands C, C as shown in FIG. 8, the rigidity of the belt 4 may be transmitted to the tread to prevent reduction of stiffness of the tread, so that a steering stability at high speed may be maintained.

In addition, the inner band 5 is in a range of 15 to 40% of the width W4A of the belt ply 4A having the maximum width, and when the outer band 6 is provided, its width W6 is also set in the same range, and it is preferable to form so as to have a smaller width W6 than the width W5 of the inner band 5.

In this case, if the width W5 of the inner band is smaller than 15%, the preventive effect of separation from the rubber at the end part of the belt 4 is inferior, and it is not necessary to exceed 40% from the viewpoint of the separation preventive function. Incidentally, the provision of the range in which the carcass 3 and the belt 4 directly contact with each other helps to transmit the tension of the carcass 3 to the belt 4.

Similarly, if the width W6 of the outer band 6 is less than the 15%, the preventive function of separation from the rubber is inferior, the same as in the case of the inner band 5, and it is not necessary to exceed 40% likewise. Besides, to set the width W6 of the outer band 6 smaller than the width W5 of the inner band 5 is intended to prevent difference in the rigidity as the inner edges (f, g) in the widthwise direction of the tire coincide with each other. Also from the viewpoint of prevention of separation of rubber, it has been found that the function may be exhibited if the outer band 6 is smaller in width. Meanwhile, the outer band 6 can be extended in the width as shown in FIG. 2.

The tire 1 is installed in a specified rim R which is determined for each tire. When inflated to 5% of the standard pressure determined for each tire, the tread surface is formed by an inner arc part T1 forming its crown portion, and by outer arc parts T2 forming its shoulder portions. The inner arc part T1 is composed of the arc plane with the radius of curvature TR1 having the central point on the tire equator C, while the outer arc part T2 is composed of the arc plane with the radius of curvature TR2.

In the tire 1, when inflated to the 5% pressure, the ratio TR2/TR1 of the radius of curvature TR2 to the radius of curvature TR1 is set in a range of 0.15 to 0.45, or preferably 0.20 to 0.35.

More specifically, by disposing the inner band 6 at the end part of the belt 4, the rigidity of the shoulder portion is increased, so that the bulge-out amount, when inflated, of the shoulder portion, that is, the outer arc part T2 is restricted. Therefore, the bulge-out amount of the crown portion, that is, the inner arc part T1 is relatively increased, and the radius of curvature TR1 of that portion is reduced, so that the distribution of ground contact pressure on the tread surface may be uneven.

Accordingly, by setting the ratio of radii of curvature TR2/TR1 within the above-mentioned range and the radius of curvature TR1 of the inner arc part T1 when inflated to the 5% pressure, larger than the radius of curvature TR2 of the outer arc part T2 preliminarily within the same range, the tread surface shape when the tire is inflated is set proper, and the distribution of the ground contact pressure is made uniform. It effectively functions in the so-called depressed tire having a low aspect ratio.

The distance K, from the tire equator C, of the border point P defined as the contact point or intersecting point of the inner arc part T1 and the outer arc part T2, is set so that this border point is located in a range L between the inner edge (f) of the crown side of the inner band 6 and the starting point (b1) of the shoulder side of the overlapped region of the belt plies 4A, 4B, in the widthwise direction of the tire. In this case, the starting point b1 refers to the position where overlapping of at least two plies is started even when the belt 4 is composed of three or more plies.

As a result, the point P which is the deflection point, is positioned in the range L of a relatively high rigidity, and even when the tire is inflated, excessive change in the curvature at the point P may be restricted, and the tread surface shape is made smooth, which contributes to uniform distribution of ground contact pressure.

The tires having the structure shown in FIGS. 1 and 3, with tire size of 195/60R14, and the specifications shown in Table 1 were fabricated as embodiments 1 to 6 of the present invention, and the reference tires 1 to 10 shown in Table 2 were also fabricated, and the high speed durability, high speed steering performance, and wear were compared. Besides, the shape of the ground contact surface was also measured. Each tire is provided with a belt comprising two plies of steel cords having an inclination angle of 19 degrees.

The durability of these tires were tested by step speed test conforming to ECE30, the results of which are shown in Tables 1, 2. The performance was better in the embodied tires 1 to 6 as compared with the reference tires 8 to 10 having no inner band. Meanwhile, the reference tire 7 using aromatic polyamide in the band was broken at a low speed.

The tires were mounted on a 1500 cc front wheel drive passenger car, and the steering performance was measured by feeling test, and the results were evaluated in three ranks. In this test, the car traveled on a flat road surface in a curved course at a speed of 80 km/h.

TABLE 1

| Tire | Ex. 1 | Ex. 2 | Ex. 3 | Ex. 4 | Ex. 5 | Ex. 6 |
| --- | --- | --- | --- | --- | --- | --- |
| Structure | FIG. 1 | FIG. 1 | FIG. 1 | FIG. 3 | FIG. 3 | FIG. 3 |
| Inner band cord | | | | | | |
| material | 6.6 Nylon | 6.6 Nylon | Polyester | 6.6 Nylon | 6.6 Nylon | Polyester |
| denier | 840 d/2 | 1260 d/2 | 1000 d/2 | 840 d/2 | 1260 d/2 | 1000 d/2 |
| inclination angle | 0 deg | 0 deg | 0 deg | 0 deg | 0 deg | 0 deg |
| Outer band cord | | | | | | |
| material | 6.6 Nylon | 6.6 Nylon | Polyester | | | |
| denier | 840 d/2 | 1260 d/2 | 1000 d/2 | | | |
| inclination angle | 0 deg | 0 deg | 0 deg | | | |
| TR1 | 860 mm | 860 mm | 860 mm | 820 mm | 820 mm | 820 mm |
| TR2 | 185 mm | 185 mm | 185 mm | 230 mm | 230 mm | 230 mm |
| TR2/TR1 | 0.215 | 0.215 | 0.215 | 0.280 | 0.280 | 0.280 |
| Distance K | 45 mm | 45 mm | 45 mm | 32 mm | 32 mm | 32 mm |
| ECE30 high speed durability test | 230 km/h | 250 km/h | 250 km/h | 220 km/h | 240 km/h | 230 km/h |
| High speed steering stability | 4 | 4 | 4 | 4.5 | 4.5 | 4.5 |

TABLE 1-continued

| | | | | | | |
|---|---|---|---|---|---|---|
| Wear uniformity | 10 | 9 | 9 | 10 | 9 | 9 |

TABLE 2

Figure 4:
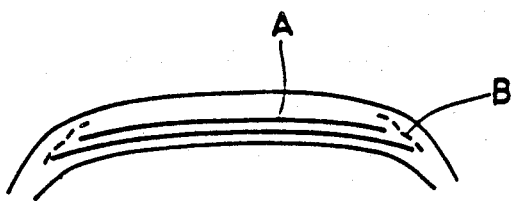
FIGS. 4 to 9 are diagrams each showing a conventional structures.

| Tire | Ref. 1 | Ref. 2 | Ref. 3 | Ref. 4 | Ref. 5 | Ref. 6 | Ref. 7 | Ref. 8 | Ref. 9 | Ref. 10 |
|---|---|---|---|---|---|---|---|---|---|---|
| Structure | FIG. 1 | FIG. 1 | FIG. 1 | FIG. 3 | FIG. 3 | FIG. 3 | FIG. 1 | FIG. 4 | FIG. 5 | FIG. 8 |
| Inner band cord | | | | | | | | | | |
| material | 6.6 Nylon | 6.6 Nylon | Polyester | 6.6 Nylon | 6.6 Nylon | Polyester | Aramide | | | |
| denier | 840 d/2 | 1260 d/2 | 1000 d/2 | 840 d/2 | 1260 d/2 | 1000 d/2 | 1500 d/2 | | | |
| inclination angle | 0 deg | 0 deg | 0 deg | 0 deg | 0 deg | 0 deg | 0 deg | | | |
| Outer band cord | | | | | | | | | | |
| material | 6.6 Nylon | 6.6 Nylon | Polyester | | | | Aramide | 6.6 Nylon | 6.6 Nylon | 6.6 Nylon |
| denier | 840 d/2 | 1260 d/2 | 1000 d/2 | | | | 1500 d/2 | 840 d/2 | 840 d/2 | 840 d/2 |
| inclination angle | 0 deg | 0 deg | 0 deg | | | | 0 deg | 0 deg | 0 deg | 0 deg |
| TR1 | 450 mm | 450 mm | 450 mm | 450 mm | 450 mm | 450 mm | 450 mm | 450 mm | 450 mm | 450 mm |
| TR2 | 450 mm | 450 mm | 450 mm | 450 mm | 450 mm | 450 mm | 450 mm | 450 mm | 450 mm | 450 mm |
| TR2/TR1 | 1.0 | 1.0 | 1.0 | 1.0 | 1.0 | 1.0 | 1.0 | 1.0 | 1.0 | 1.0 |
| Distance K | | | | | | | | | | |
| ECE30 high speed durability test | 230 km/h | 250 km/h | 250 km/h | 220 km/h | 240 km/h | 230 km/h | 210* km/h | 220 km/h | 240 km/h | 230 km/h |
| High speed steering stability | 3.5 | 3.5 | 3.5 | 4 | 4 | 4 | 2.5 | 3.5 | 3 | 3 |
| Wear uniformity | 7 | 6 | 6 | 8 | 7 | 7 | 5 | 7 | 6 | 8 |

Note: clown portion was broken by excessive rigidity

The state of wear was tested by mounting on actual cars. The state of wear was to show the uniformity of wear, and after traveling at a rated load for 3,000 km, all tires were evaluated in ten ranks. In these tests, the larger point means the better state of wear.

Figure 10:
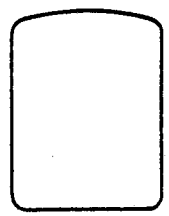
FIGS. 10 to 12 are diagrams showing the shape of the ground contact surface.
Figure 11:
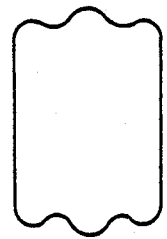
Figure 12:
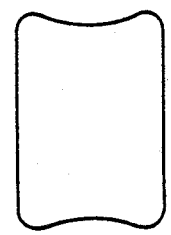

The embodied tires were, as compared with the reference tires, worn uniformly without uneven wear. The shape of the ground contact surface is schematically shown in FIG. 10 (embodied tire 3), FIG. 11 (reference tire 7), and FIG. 12 (reference tire 8). The embodied tire 3 is found to have a smooth ground contact surface shape, which is considered to be due to the uniform distribution of the ground contact pressure.

Thus, the pneumatic tire of the present invention has at least a pair of inner bands using stretchable band cords made of organic fibers disposed between the carcass and belt, with the band cords being substantially parallel to the tire equator, and is capable of effectively preventing separation from the rubber at the belt end parts while maintaining high speed steering stability, and also enhancing durability at high speed.

In addition, since the ratio of radii of curvature of the inner arc part and outer arc part of the tread surface and the boundary point are kept within a specified range, the distribution of ground contact pressure is made uniform, and uneven wear may be prevented at the same time.

We claim:

1. A pneumatic tire having improved steering stability and high speed durability consisting essentially of:
   a pair of bead cores,
   a carcass turned up at both of its ends and extending around and secured to said bead cores,
   a tread disposed on said carcass and having a tread surface comprising an axially inner arc portion with a radius of curvature TR1 and two axially outer arc portions with a radius of curvature TR2,
   a belt comprising at least two plies of steel cords disposed radially outside said carcass, and
   a pair of axially, spaced-apart inner bands disposed between said carcass and said belt, each of said bands having stretchable organic fiber cords laid substantially parallel to the tire equator, wherein
   the axially outer edge of said inner bands and the edges of the widest ply of said belt are substantially aligned so that the outer edge of each inner band coincides with the edge of the widest belt ply or wherein the outer edge of each inner band projects outwardly not more than 8 mm from the outer edge of the widest belt ply,
   the ratio TR2/TR1 of said radius TR2 to the radius TR1 is in a range of 0.15 to 0.45 when the tire is mounted on a standard rim and inflated to 5% of the standard pressure, and
   each border P between said inner arc portion and said outer arc portions is located in a region extending axially outward from the axially inner edge of each inner band to the axially outer edge of an overlapping region where said at least two plies of said belt are overlapped.

2. The tire according to claim 1, wherein said belt comprises two plies of steel cords, in which the radially inner ply is wider than the outer ply.

3. The tire according to claim 1, wherein the width W5 of said inner band is in a range of 15 to 40% of the width W4 of said widest ply of said belt.

4. The tire according to claim 1, wherein the tire further comprises a pair of breaker cushions made of soft rubber and disposed between the axially outer edge portion of each inner band and said carcass.

5. The tire according to claim 1, wherein the tire further comprises a pair of axially, spaced-apart outer bands made of stretchable organic fiber cords and disposed radially outside said belt, and the width W6 of each outer band is in a range of 15 to 40% of the width W4 of said widest ply of said belt, and further the width W6 is smaller than the width W5 of said inner band.

6. The tire according to claim 1, wherein the tire further comprises an outer band made of stretchable organic fiber cords and disposed radially outside said belt, and the width thereof is substantially the same as the width W4 of said widest ply of said belt.

7. The tire according to claim 1, wherein the organic fiber cord is a heat-shrinkable cord.

* * * * *